(12) United States Patent
Thorn

(10) Patent No.: US 7,843,343 B2
(45) Date of Patent: Nov. 30, 2010

(54) METHODS, COMPUTER PROGRAM PRODUCTS, TERMINALS AND SYSTEMS FOR PROVIDING LOCATION REPORTING OF RFID ENABLED MOVEABLE OBJECTS

(75) Inventor: Karl Ola Thorn, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 407 days.

(21) Appl. No.: 11/849,611

(22) Filed: Sep. 4, 2007

(65) Prior Publication Data

US 2009/0058651 A1    Mar. 5, 2009

(51) Int. Cl.
    G08B 13/14    (2006.01)
(52) U.S. Cl. .................... 340/572.1; 340/10.1; 340/10.5
(58) Field of Classification Search .............. 340/572.1, 340/10.1, 505
    See application file for complete search history.

(56) References Cited

U.S. PATENT DOCUMENTS

| 6,297,737 | B1 | 10/2001 | Irvin |
| 6,331,817 | B1 | 12/2001 | Goldberg |
| 7,176,801 | B2 * | 2/2007 | Matsukawa et al. ...... 340/572.5 |
| 2004/0085207 | A1 * | 5/2004 | Kreiner et al. ........... 340/572.1 |
| 2005/0285731 | A1 | 12/2005 | Outlaw et al. |

OTHER PUBLICATIONS

Notification of Transmittal of the International Search Report and the Written Opinion of the International Searching Authority, or the Declaration, International Search Report, and Written Opinion of the International Searching Authority, PCT Application No. PCT/EP2008/050806, Apr. 16, 2008.

* cited by examiner

*Primary Examiner*—Travis R Hunnings
(74) *Attorney, Agent, or Firm*—Myers Bigel Sibley & Sajovec, P.A.

(57) ABSTRACT

A method of providing location information associated with moveable objects can include periodically receiving identification (ID) information at a first terminal from a moveable object via a Radio Frequency Identification (RFID) signal. Location information associated with the ID information can be updated to provide updated location information for the moveable object. The ID information relative to the first terminal may be evaluated to determine if the moveable object is associated with the first terminal. The location information may be sent to a second terminal, if the moveable object is associated with the second terminal.

23 Claims, 7 Drawing Sheets

METHODS, COMPUTER PROGRAM PRODUCTS, TERMINALS AND SYSTEMS FOR PROVIDING LOCATION REPORTING OF RFID ENABLED MOVEABLE OBJECTS

BACKGROUND

Radio Frequency Identification (RFID) refers to the use of low-cost "tags" embedded in or attached to items that can store "bar code" type information, as well as more detailed information about the items. The tags are generally small labels, or the like, with a miniature embedded antenna. A tag reader interrogates the tag by transmitting an RFID signal, which energizes the embedded antenna to provide power for the tag to transmit a responsive RFID signal to the reader.

Various commercial applications have been suggested for RFID tags, particularly in the area of retail marketing and sales. For example, RFID technology may be used to gather information related to consumer trends, purchasing habits, consumption rates, etc. It is also known to use RFID technology in the areas of inventory control, manufacturing process and control, product accountability and tracking systems, etc. Manufacturers, shippers, and retailers may be able to follow a given product through their respective systems from initial production through to point of sale using RFID tags. It has been suggested that other applications may include shopping carts that automatically charge a bank account, refrigerators that connect to the Internet to automatically reorder items, and interactive televisions linked to such refrigerators that will feed targeted commercials and special offers to consumers.

RFID readers have been incorporated into various electronic devices such as Personal Data Assistants (PDAs) and mobile cellular telephones.

SUMMARY

Embodiments according to the invention can provide methods, computer program products, terminals, and systems for providing location information associated with moveable objects. Methods of some embodiments include periodically receiving identification (ID) information at a first terminal from a moveable object via a Radio Frequency Identification (RFID) signal and updating location information associated with the ID information to provide updated location information for the moveable object. Such embodiments may also include evaluating the ID information relative to the first terminal to determine if the moveable object is associated with the first terminal and sending the location information to a second terminal, if the moveable object is associated with the second terminal.

In some embodiments, the first terminal includes a mobile terminal and the second terminal includes a stationary terminal. In some embodiments, sending the location information includes providing a map including the location information on a display of the second terminal.

In some embodiments, updating location information includes determining new location information associated with the ID information using Global Position System (GPS) information for the first terminal responsive to the periodically received ID information and updating the location information with the GPS information to provide the updated location information for the moveable object.

In some embodiments, updating location information includes determining new location information associated with the ID information using network location information for the first terminal responsive to the periodically received ID in formation and updating the location information with the network location information to provide the updated location information for the moveable object.

Some embodiments may include activating a location ignore flag, wherein if the location ignore flag is activated to an ignore state, then the location information is not sent to the second terminal.

In some embodiments, the movable object includes one of multiple movable objects having respective unique ID information, the multiple movable objects configured to transmit the respective unique ID information to the first terminal via RFID signals. Some such embodiments may include providing a most recently known location information for the multiple movable objects. In some embodiments, providing the most recently known location information includes providing the most recently known location information via a webpage available via the Internet. A Some embodiments include a computer program product configured to operate according to the methods described herein.

Devices according to embodiments of the present invention may include a mobile terminal. Some embodiments of the mobile terminal include a mobile terminal transceiver circuit, a Radio Frequency Identification (RFID) interface circuit configured to periodically receive identification (ID) information from a movable object via an RFID signal from movable objects equipped with RFID tags and a processor circuit, coupled to the mobile terminal transceiver circuit, the processor circuit configured to coordinate the operation of the mobile terminal including the mobile terminal transceiver circuit and configured to transmit ID information to a database to determine if the ID information is associated with the mobile terminal.

Some embodiments include a location circuit configured to determine location information corresponding to the mobile terminal. In some embodiments, the location circuit is further configured to provide location information corresponding to the mobile terminal using GPS information.

In some embodiments, the location circuit is further configured to provide location information corresponding to the mobile terminal using communication network location information corresponding to the mobile terminal.

In some embodiments, if the ID information is not associated with the mobile terminal, a location information message is generated and sent to all associated terminal that is associated with the ID information. In some embodiments, the location information message includes a map including the location information on a display of the associated terminal.

Embodiments of the present invention may also include systems for providing location information associated with movable objects. Embodiments of such systems may include a database that is configured to associate multiple terminals and respective ID information corresponding to moveable objects, a first terminal that is configured to receive identification (ID) information from a movable object via Radio Frequency Identification (RFID) signal and generate location information corresponding to the location of the first terminal, and a second terminal that is associated with the ID information corresponding to the movable object, the second terminal is configured to receive the ID information and location information corresponding to the first terminal.

Some embodiments include a comparison circuit that is configured receive the ID information corresponding to the moveable object from the first terminal and determine if the first terminal is associated with the moveable object. In some embodiments, the comparison circuit is further configured to determine that the second terminal is associated with the moveable object.

Some embodiments include means for updating location information associated with the ID information and means for sending updated location information to the second terminal.

DESCRIPTION OF EMBODIMENTS ACCORDING TO THE INVENTION

Figure 1:
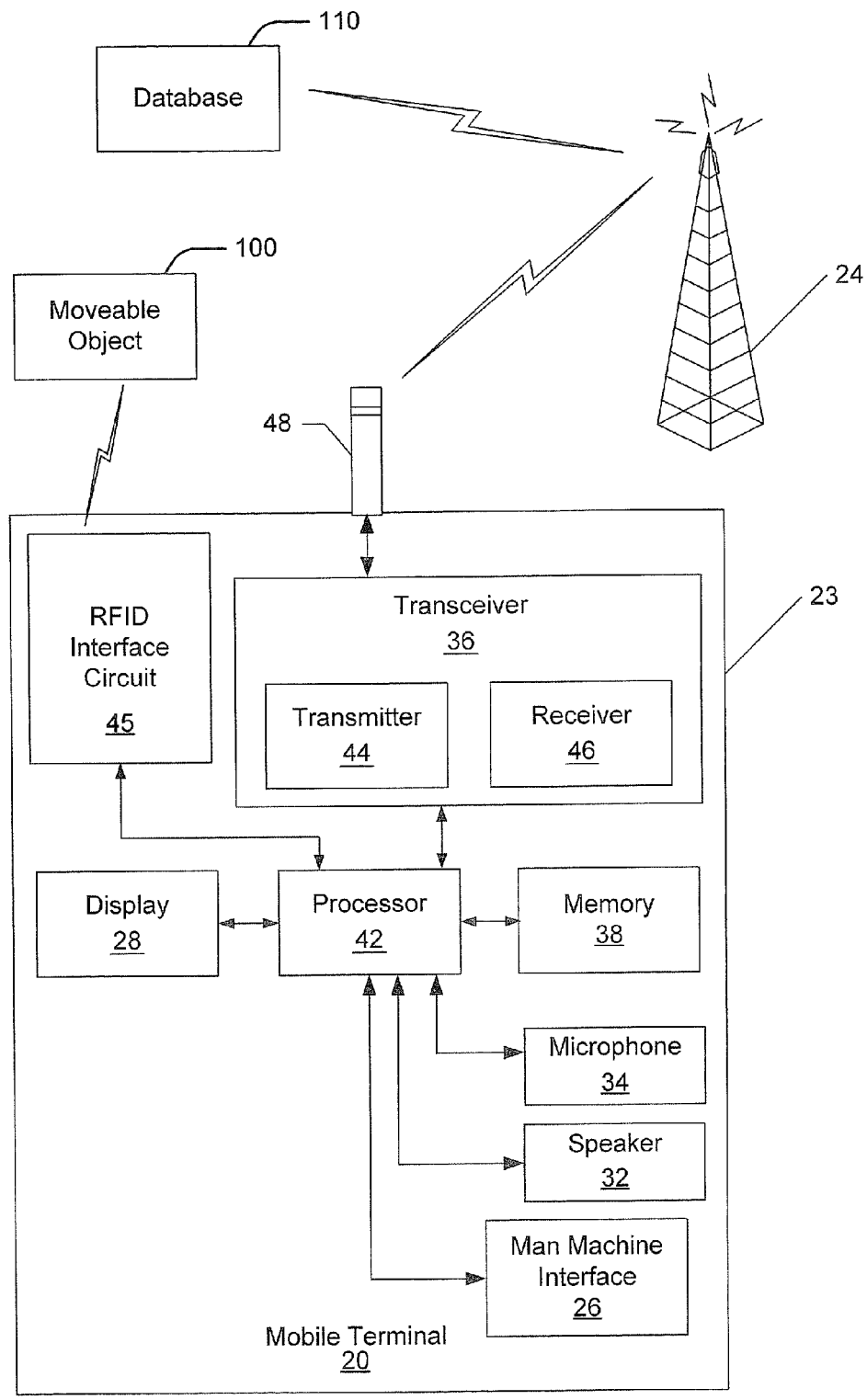
FIGS. 1 and 2 are schematic diagrams of mobile terminals according to some embodiments of the invention and exemplary base station transceivers.

The invention is described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specific disclosure and will not be interpreted in an idealized or overly formal sense unless expressly so defined herein.

It should be emphasized that the term "comprises/comprising" when used in this specification is taken to specify the presence of stated features, integers, steps or components but does not preclude the presence or addition of one or more other features, integers, steps, components or groups thereof.

It will be understood that although the terms first and second may be used herein to describe various components these components should not be limited by these terms. These terms are only used to distinguish one component from another. Thus, for example, a first component discussed below could be termed a second component without departing from the teachings of the present invention.

It will be understood that the invention may be practiced with any terminal that operates in a communications network. For example, some embodiments may be practiced with mobile terminals and/or stationary terminals. A mobile terminal may be, for example, a single or dual mode cellular radiotelephone with or without a multi-line display; a Personal Communications System (PCS) terminal that may combine a cellular radiotelephone with data processing, facsimile and data communications capabilities; a Personal Data Assistant (PDA) that can include a mobile terminal, pager, Internet/intranet access, Web browser, organizer, calendar and/or a global positioning system (GPS) receiver; and a conventional laptop and/or palmtop receiver or other appliance all of which include a radiotelephone transceiver.

It will be understood mobile terminals according to the invention may operate in any type of wireless communications network. In some embodiments according to the invention, for example, the network may provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA).

As described herein in greater detail, in some embodiments according to the invention, a first terminal periodically receives unique Identification (ID) Information from RFID tags coupled to moveable objects, such as a wallet, a briefcase, a set of keys, rental equipment, etc. The first terminal can then send the ID information to a database to determine if the moveable object is associated with the first terminal. If the moveable object is not associated with the first terminal, the first terminal can determine location information, using for example GPS and/or location information that is available through a network in which the first terminal communicates.

Additionally, a second terminal that is associated with the ID information for each moveable object may receive the location information. As the location information is periodically determined, the second terminal may receive updated location information for the moveable objects. This can continue periodically for each of the moveable objects if the moveable object remains within RFID range to receive and transmit to the first terminal.

Although discussed in the context of RFID, embodiments herein are not so limited. In this regard, other technologies capable of wirelessly providing identification information are contemplated herein. For example, other near-field communication (NFC) devices such as Bluetooth capable and/or magnetically encoded and/or triggered devices may be utilized herein to provide identification information.

Figure 2:
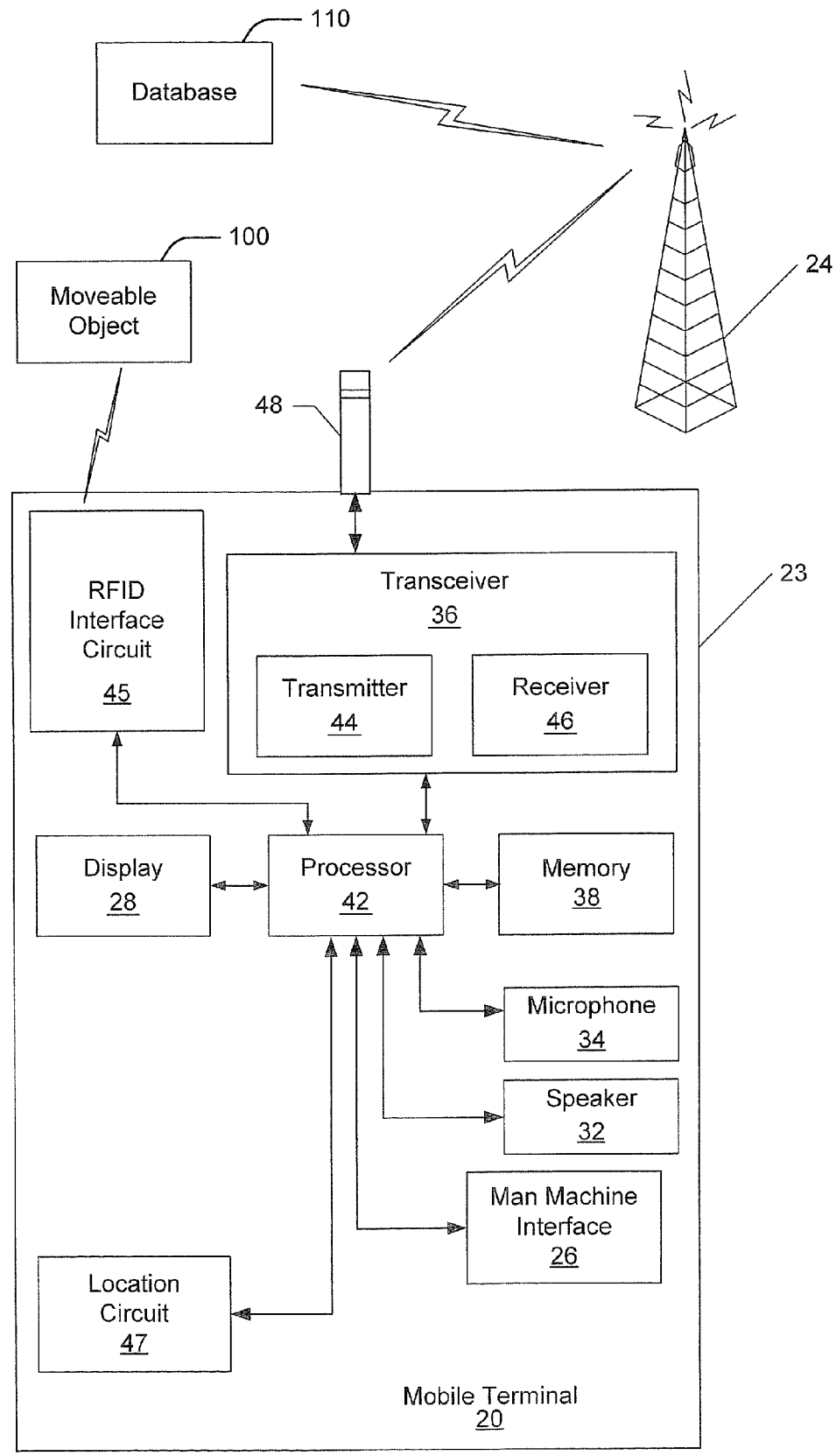

Reference is now made to FIGS. 1 and 2, which are schematic diagrams of mobile terminals according to some embodiments of the invention and exemplary base station transceivers. Although some embodiments of the present invention are discussed herein as being included as part of a mobile terminal, for example, mobile terminal 20 of FIG. 1, embodiments of the present invention are not limited to this configuration. Embodiments of the present invention may be included in any wired and/or wireless device capable of communicating over a network such as, for example, the Internet, a Local Area Network (LAN), and/or a Wide Area Network (WAN), among others, without departing from the scope of the present invention.

FIGS. 1 and 2 include a mobile terminal 20 and a base station transceiver 24 in a wireless communications network. The mobile terminal 20 includes a portable housing 23 and may include a man machine interface 26, a display 28, a speaker 32, a microphone 34, a transceiver 36, and a memory 38, any of which may communicate with a processor 42.

Further, mobile terminals 20 according to some embodiments of the present invention may further include a Radio Frequency Identification (RFID) interface circuit 45. The processor 42 can be any commercially available or custom microprocessor.

The transceiver 36 typically includes a transmitter circuit 44 and a receiver circuit 46, which respectively transmit outgoing radio frequency signals to the base station transceiver 24 and receive incoming radio frequency signals, such as voice signals and/or data signals, from the base station transceiver 24 via an antenna 48. The antenna 48 may be an embedded antenna, a retractable antenna and/or any antenna known to those having skill in the art without departing from the scope of the present invention. Radio frequency signals transmitted between the mobile terminal 20 and the base station transceiver 24 may comprise both traffic and control signals (e.g., paging signals/messages for incoming calls), which are used to establish and maintain communication with another party and/or destination. The processor 42 may support various functions of the mobile terminal 20 including Internet applications and communications.

As used herein, the term "mobile terminal" may include: a cellular radiotelephone with or without a multi-line display; a Personal Communications System (PCS) terminal that may combine a cellular radiotelephone with data processing, facsimile and data communications capabilities; a Personal Digital Assistant (PDA) that can include a radiotelephone, pager, Internet/intranet access, Web browser, organizer, calendar and/or a Global Positioning System (GPS) receiver; a gaming device, an audio video player, and a conventional laptop and/or palmtop portable computer that may include a radiotelephone transceiver.

In some embodiments of the present invention, the base station transceiver 24 comprises the radio transceiver(s) that defines an individual cell in a cellular network and communicates with a mobile terminal 20 in other terminals in the cell using a radio-link protocol. In some embodiments, the base station transceiver 24 is configured to communicate with one or more devices comprising a database 110. Although only a single base station transceiver 24 is shown, it will be understood that many base station transceivers may be connected through, for example, a mobile switching center and other devices to define a wireless communications network.

The processor 42 may be implemented using a variety of hardware and software. For example, operations of the processor 42 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP). The processor 42 may provide digital signal processing operations such as scanning for an acceptable control channel, camping on a control channel (including maintaining synchronization with the base station that communicates with the mobile terminal 20), Voice Activated Dialing (VAD) services, performing media operations and the like.

The database 110 may be implemented in a variety of data processing equipment including, for example, servers, desktop computers, mainframes, mobile terminals and/or network processors using wireless and/or wired communications. The database 110 may include multiple fields corresponding to uniquely identified movable objects 100. For example, fields may include ID information, terminal information associated with the movable object 100, descriptive information regarding the movable object 100, and/or updated location information.

Although the present invention may be embodied in communication devices or systems, such as the mobile terminal 20, the present invention is not limited to such devices and/or systems. Instead, the present invention may be embodied in any apparatus that is capable of communicating over communications networks according to embodiments of the present invention. Additionally, the present invention may be embodied in any device that features an object identification function and a location determination function.

The mobile terminal 20 includes a Radio Frequency Identification (RFID) interface circuit 45 that can transmit RFID signals to the RFID tags and can periodically receive identification (ID) information that uniquely identifies the RFID tags coupled to moveable objects 100. RFID refers to the use of radio frequency signals to read information stored in a small device, sometimes referred to as an "RFID tag." The "tag" can be attached to the moveable objects 100 and may be any shape/size that can be incorporated into/on the moveable objects 100. The moveable objects 100 can be wallets, keys, mobile telephones, clothing, automobiles, and may even be included in printed inks on, for example, paper. Other moveable objects 100 can also incorporate RFID tags.

The information stored in the tag can be identification (ID) information that can uniquely identify the moveable object 100 associated with the tag. For example, two different moveable objects 100 can have respective tags that each store different ID information that can be used by the mobile terminal 20 to distinguish the two moveable objects 100. It will be understood that the RFID interface circuit 45 includes an RFID antenna (not shown) via which the RFID signals are transmitted/received. The R-ID antenna can be included in the antenna system 48 or can be a separate structure (internal or external). The mobile terminal 20 can also include an RFID tag that includes ID information that uniquely identifies the mobile terminal 20 (as a moveable object 100 according to some embodiments of the invention).

In operation, the ID information stored in the RFID tag can be "read" by transmitting an RF signal from the RFID interface circuit 45 to energize an RF antenna associated with the tag, if the tag is within transmit range of the RFID interface circuit 45. Once energized, the tag transmits an RFID signal including the ID information stored in the tag using a tag transmitter circuit. It will be understood that the energy imparted to the tag antenna can be used to power the tag transmitter circuit and ancillary circuits used by the tag to transmit. Accordingly, the tag may not require a battery or other on-board power source, which are sometimes referred to as passive RFID tags. In some embodiments, the tag antenna may be configured to provide attenuation over distances greater than an immediate proximity. The RFID interface circuit 45 can receive the RFID signal transmitted by the tag (if within range of the tag transmitter) including the ID information that uniquely identifies the moveable object 100. The RFID tags are discussed further, for example, on the Internet at idtechex.com/pdfs/en/O7289Z3822.pdf, which is hereby incorporated herein by reference. In some embodiments, the tag may also be capable of receiving and/or storing data, such as, for example, location information.

A memory 38 can store computer program instructions that, when executed by the processor 42, carry out the operations described herein and shown in the figures. The memory 38 can be non-volatile memory, such as EEPROM (flash memory), that retains the stored data while power is removed from the memory 38. The memory 38 can also store a location information table including location information, such as most recently known location information/time information as to when the most recently known location information was established, settable/clearable alarm flags, other IDs, and other location information according to embodiments of the invention. In some embodiments, location information may be stored on other devices, such as, for example, servers, other terminals, and/or identification tags, among others.

In some embodiments, a database and/or portions thereof may be implemented within a mobile terminal 20. For example, a mobile terminal 20 may include ID information for movable objects 100 that are associated with the mobile terminal 20. In this manner, if the movable object 100 is associated with the mobile terminal 20, a communication to an external database to determine an association of the movable object 100 may be precluded.

In some embodiments, if a settable/clearable location ignore flag associated with a particular moveable object 100 is in the set state, the mobile terminal 20 will not receive location information corresponding to the moveable object 100 that is identified by another terminal in another location. For example, a user may not want location information regarding a moveable object that is in a known location and/or in possession of a known party.

Referring to FIG. 2, in some embodiments, a mobile terminal may include a location circuit 47 that is configured to determine the location information of the mobile terminal 20. In this manner, location information may be determined for a movable object 100 based on the ID information received firm the moveable object 100 via an RFID interface circuit 45. In some embodiments according to the invention, the location circuit 47 is a Global Positioning System (GPS) location circuit, including a GPS receiver circuit, that uses, for example, any available GPS or assisted GPS based location approach in conjunction with a GPS satellite system 274. Such approaches are commonly referred to as assisted-GPS, which is defined, for example, in specification numbers 3GPP TS 04.31, 3GPP TS 03.71 and 3GPP TS 04.35.

In some embodiments, the location circuit 47 is a network location circuit that uses location information provided by the network, such as a base station ID, that has location information associated therewith. In some embodiments, the location circuit 47 is a local area network location circuit that uses location information provided via a local wireless network to determine the location information for the moveable objects 100. Other location determination approaches may be used. In some embodiments, the local area network is a WLAN compliant network. In some embodiments, the local wireless network is a Bluetooth compliant interface. In any event, the local wireless network can be used to provide information to the location circuit 47 to determine the location information that can be applied to the moveable objects 100 in communication with the mobile terminal 20.

It will be understood that the location information determined by the mobile terminal 20 may be determined and maintained separately from the periodic receipt of identification information from the moveable objects 100. In other words, the mobile terminal 20 may operate the location determination circuit separately from the RFID interface circuit. For example, the location circuit 47 may periodically determine the location of the mobile terminal 20 and make the location information available in the memory 38 or a register of the mobile terminal 20. When the identification information is received at the mobile terminal 20, the location information made available in the memory 38 or the register can be accessed and entered into a location information table in association with the identification information for the moveable object 100.

In some embodiments, the location circuit 47 may include and/or work in conjunction with a motion detection circuit. For example, once the location is determined, if the motion detection circuit does not detect motion, the location determination circuit 47 may be disabled to conserve on-board power until the mobile terminal 20 changes location again, as detected by the motion detection circuit.

It will be further understood that the determination of the location information can be provided on a variable basis, such as every 30 seconds or every minute, depending on the user preference and the available services. It will be further understood that offsets to the location information may be determined at the time of reception of the identification information and applied to the location information available in the memory 38 or the register.

Figure 3:
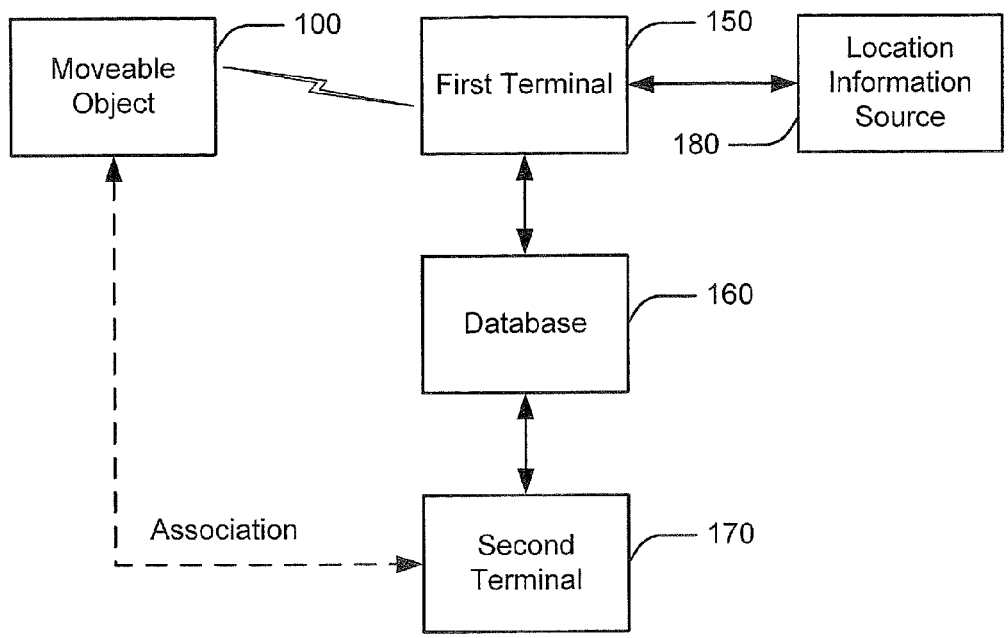
FIG. 3 is a block diagram illustrating systems for providing location information associated with moveable objects according to some embodiments of the present invention.

Reference is now made to FIG. 3, which is a block diagram illustrating systems for providing location information associated with moveable objects according to some embodiments of the present invention. A first terminal 150 is configured to periodically receive ID information from a movable object 100 via, for example, RFID. The first terminal 150 is communicatively coupled to a database 160. The database 160 is configured to associate multiple terminals and respective ID information corresponding to multiple movable objects. For example, the database 160 may include information corresponding to an association between the movable object 100 and a second terminal 170.

As illustrated, the first terminal 150 does not have an association with the movable object 100. The first terminal 150 communicates with a location information source 180. The location information source 180 provides location information to the first terminal 150 that may correspond to the location of the movable object 100. In some embodiments, the first terminal 150 may transmit location information to the database 160, which may transmit ID information and location information corresponding to the movable object 100 to the second terminal 170. In this manner, the second terminal 170 may be notified of the location of the movable object 100 by virtue of proximity between the movable object 100 and the first terminal 150. Although, as illustrated, the second terminal 170 receives location information from the database 160, in some embodiments, the database 160 may be used primarily for data storage and/or lookup functions. For example, location and ID information may be sent to the second terminal 170 via another network device and/or from the first terminal 150 via the communications network.

In some embodiments, the second terminal 170 and/or the first terminal 150 may be mobile or stationary. For example, the second terminal 170 may be a stationary device is associated with the movable object 100. The association between the second terminal 170 and the movable object 100 may arise from common ownership and/or use, such as, for example, where a user is a user and/or owner of both the second terminal 170 and the movable object 100. In some embodiments, the first terminal 150 may be a mobile terminal that, by virtue of its mobility, becomes proximate the movable object 100. In some embodiments, the first terminal 150 may be a stationary terminal that becomes proximate the movable object 100 by virtue of the mobility of the movable object 100. For example, if the movable object 100 may be moved into proximity with the first terminal 150.

Figure 4:
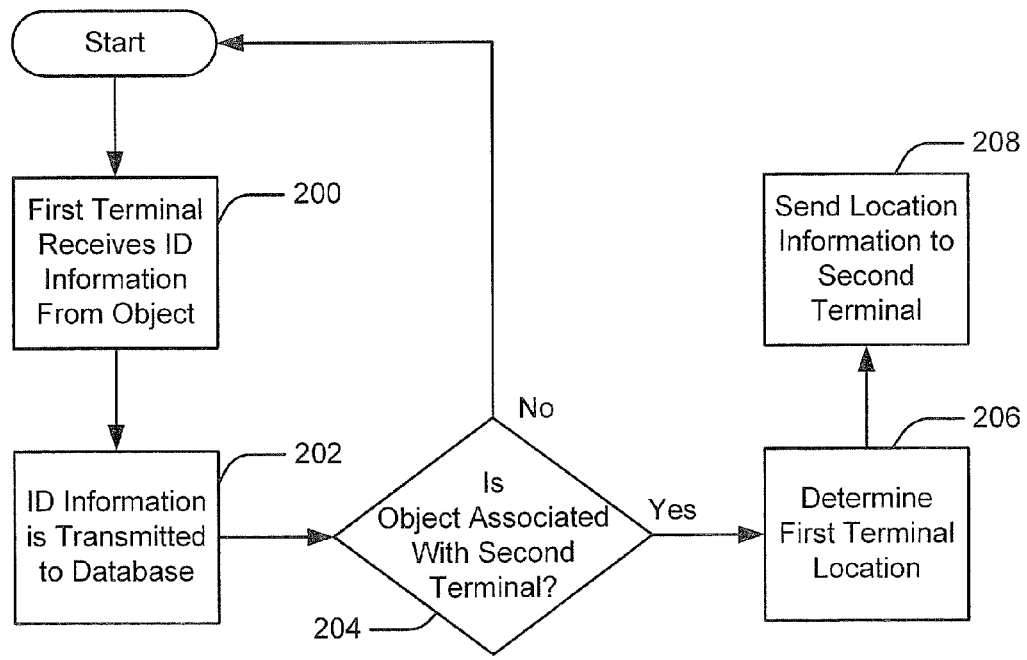
FIG. 4 is a flow diagram illustrating operations for providing location information associated with moveable objects according to some embodiments of the present invention.

Reference is now made to FIG. 4, which is a flow diagram illustrating operations for providing location information associated with moveable objects according to some embodiments of the present invention. Operations start when the first terminal receives ID information from the movable object (block 200). The ID information may be received via a wireless data transmission, such as, for example, RFID. The ID information is transmitted to a database (block 202). The database is configured to provide association information between multiple movable objects and their corresponding terminals, users and/or owners. For example, using association information in the database, the operations can determine whether if the movable object is associated with a second terminal (block 204).

If the movable object is not associated with a second terminal, then no further action may be taken regarding the interaction between the first terminal and the movable object (block 204). Alternatively, if the movable object is associated with a second terminal, a location of the first terminal may be determined. Thus, the location information for the movable object may be provided (block 206). The location information corresponding to the movable object may be sent to the second terminal (block 208). In this manner, where an owner of the second terminal and the movable object is unable to recall the location of the movable object, location information corresponding to the movable object may be received when another terminal (first terminal) becomes proximate the movable object. For example, a user may unknowingly drop his keys in some public place. When another terminal becomes proximate the lost keys, the association and location information may be determined and subsequently transmitted to the second terminal.

Another example may include multiple traveling companions sharing a common resource, such as, for example a travel book. In the case when one of the travelers wishes to use the resource, the location may be determined relative to which of the travelers is in possession of the resource.

In some embodiments, a first terminal owner may find and retrieve the lost keys. In such embodiments, the location information may be updated and sent to the user. In some embodiments, an individual not owning a terminal may find and retrieve the lost keys. In such embodiments, the keys may become proximate a terminal, stationary or mobile, that is capable of receiving the identification information from the lost keys. By virtue of proximity with the terminal and receipt of the identification information, the user may receive location information corresponding to the lost keys.

Figure 5:
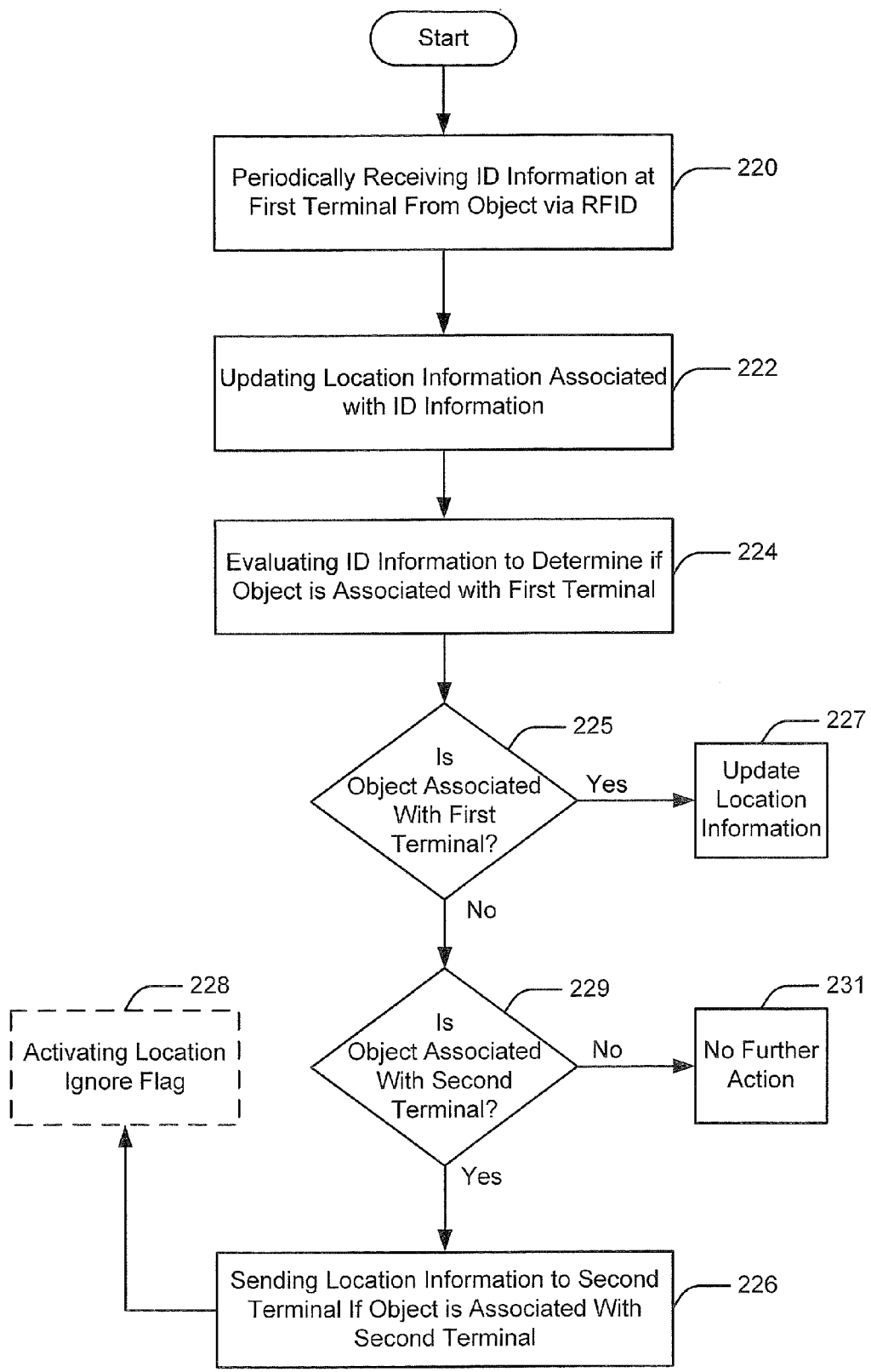
FIG. 5 is a flow diagram illustrating operations for providing location information associated with moveable objects according to some embodiments of the present invention.

Reference is now made to FIG. 5, which is a flow diagram illustrating operations for providing location information associated with moveable objects according to some embodiments of the present invention. Operations may include periodically receiving ID information at a first terminal from a movable object in via RFID (block 220). In some embodiments, the first terminal is a mobile terminal and is configured to receive the ID information by virtue of proximity with the movable object. In some embodiments, the first terminal is a stationary terminal and may become proximate the movable object by virtue of the mobility of the movable object.

Location information associated with the ID information may be updated to provide updated location information for the movable object (block 222). In some embodiments, updating location information includes determining new location information associated with the ID information using Global Position System (GPS) information for the first terminal. In some embodiments, the location information is determined responsive to the periodically received identification information. The location information may then be updated with the GPS information to provide updated location information for the movable object. In some embodiments, updating location information includes determining new location information associated with the identification information using network location information for the first terminal. The location information can be updated with the network location information to provide updated location information for the movable object. In some embodiments, location information may be stored and/or updated within the first terminal for periodic transmission and/or retransmission in the case of, for example, a temporary reduction in communication capacity.

The ID information may be evaluated to determine if the object is associated with the first terminal (block 224). In some embodiments, evaluating the ID information may include comparing the ID information to a data in a database. In some embodiments, portions of the database may be implemented within a mobile terminal. For example a mobile terminal may include ID information for movable objects associated with a mobile terminal. A database may include information associated with the unique ID information, such as, for example, user information, terminal information, location information and/or status information. User information may include an identity of the user associated with the ID information corresponding to the movable object. Terminal information may include terminal identification, network address, telephone number, e-mail address, and/or terminal type, among others. Status information may include flags and/or other control bits corresponding to lost/found status, ignore status and/or active/inactive state. If the ID information is evaluated to determine that the movable object is associated with the first terminal (block 225) then location information corresponding to the movable object may be updated without further action (block 227). In this manner, if the movable object becomes lost or misplaced, the first terminal may be used to determine recently updated location information.

If the movable object is not associated with a second terminal (block 229) then no further action is taken (block 231). If the movable object is associated with a second terminal (block 229), then location information corresponding to the movable object may be sent to the second terminal (block 226). In this manner, the location of the movable object may be provided to the second terminal so that the movable object may be potentially retrieved. In some embodiments, sending the location information includes providing a map including location information on a display of the second terminal. In some embodiments, operations may optionally include activating a location ignore flag (block 228). If the location ignore flag is activated to an ignore state then the location information is not sent to the second terminal. For example, in the case where a movable object is intentionally placed and/or left in a condition that is not proximate the second terminal, location information corresponding to the movable object may be unwanted and/or unnecessary. In some embodiments, a lost flag may be utilized such that location information will not be provided for movable object unless the lost flag is activated to a lost state.

In the embodiments described herein, a movable object may include one of multiple movable objects having respective unique ID information such that the multiple movable objects are configured to transmit their respective unique identification information to the first terminal via RFID signals. In such embodiments, most recently known location information may be provided for all of the multiple movable objects.

Figure 6A:
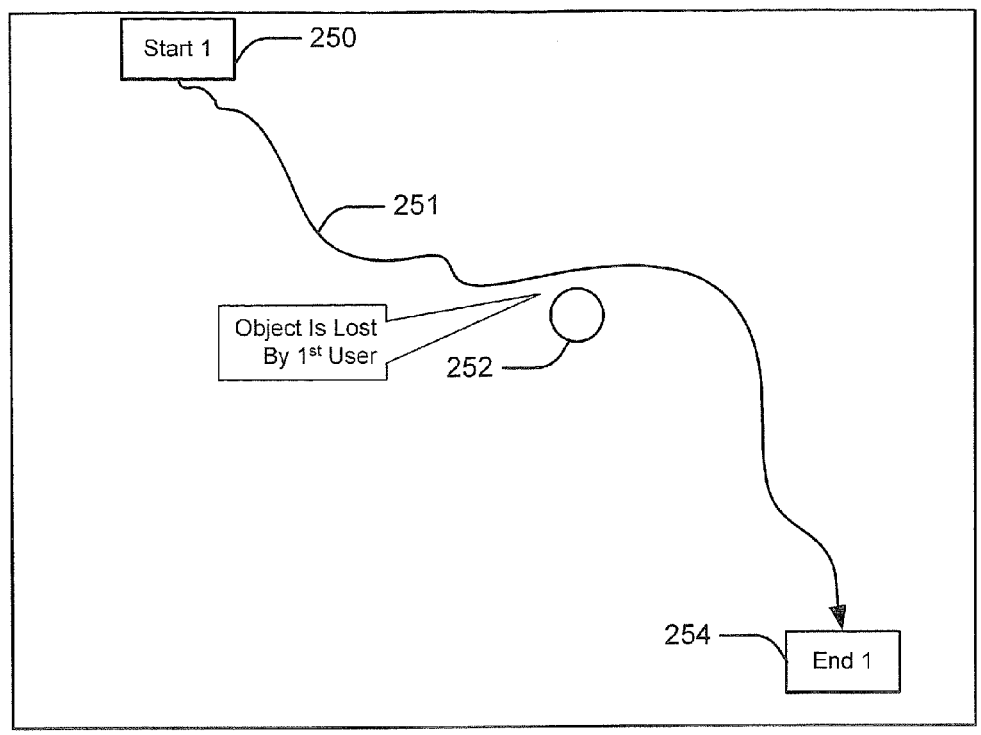
FIGS. 6A and 6B are sequential schematic diagrams illustrating an exemplary application using some embodiments of the invention.
Figure 6B:
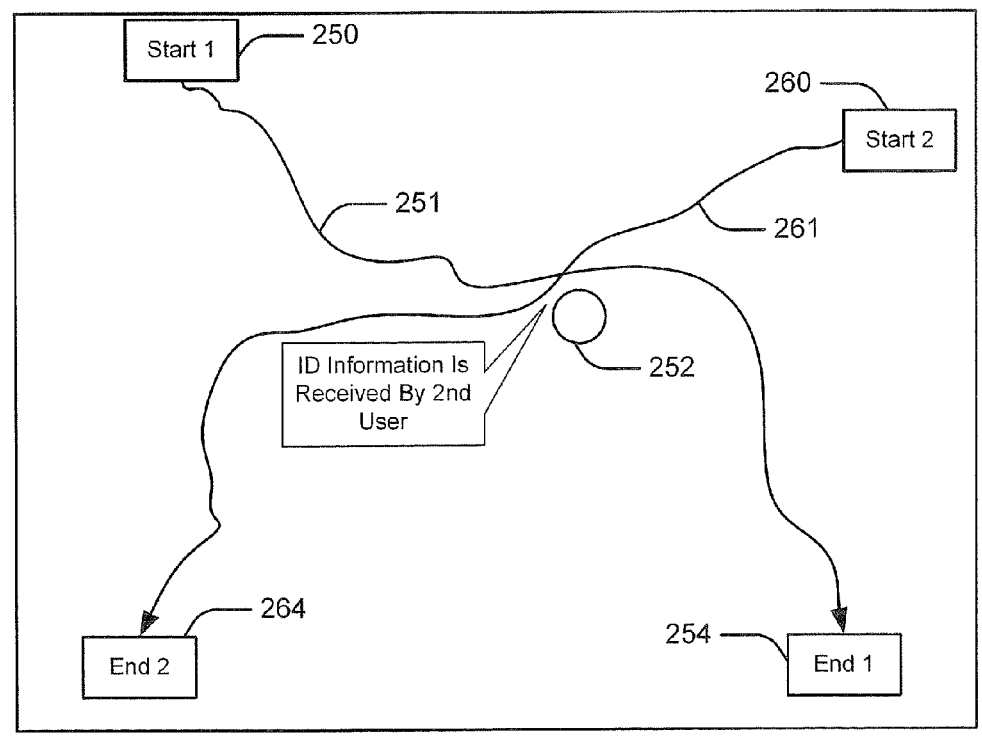

Reference is now made to FIGS. 6A and 6B, which are sequential schematic diagrams illustrating an exemplary application using some embodiments of the invention. Referring to FIG. 6A, a first user possessing a first user terminal traverses a first path 251 that begins at a first starting location 250 and ends at a first ending location 254. As the first user traverses the first path 251 be unknowingly drops a movable object 252. Referring to FIG. 6B, a second user, possessing a second user terminal, traverses a second path 261 that begins at a second starting location 261 and ends at a second ending location 264. As the second user traverses the second path 261, the second user terminal becomes proximate the movable object 252. In accordance with embodiments described herein, the second user terminal receives ID information corresponding to the movable object 252. The ID information may be evaluated and it may be determined that the movable object 252 is associated with the first user and/or a first user terminal. Location information corresponding to the location of the second user terminal may be determined and a message including location of the movable object 252 may be sent to the first user terminal. In this manner, the first user may be informed as to the location of the movable object 252 by virtue of the proximity between the second user terminal and the movable object 252.

Figure 7A:
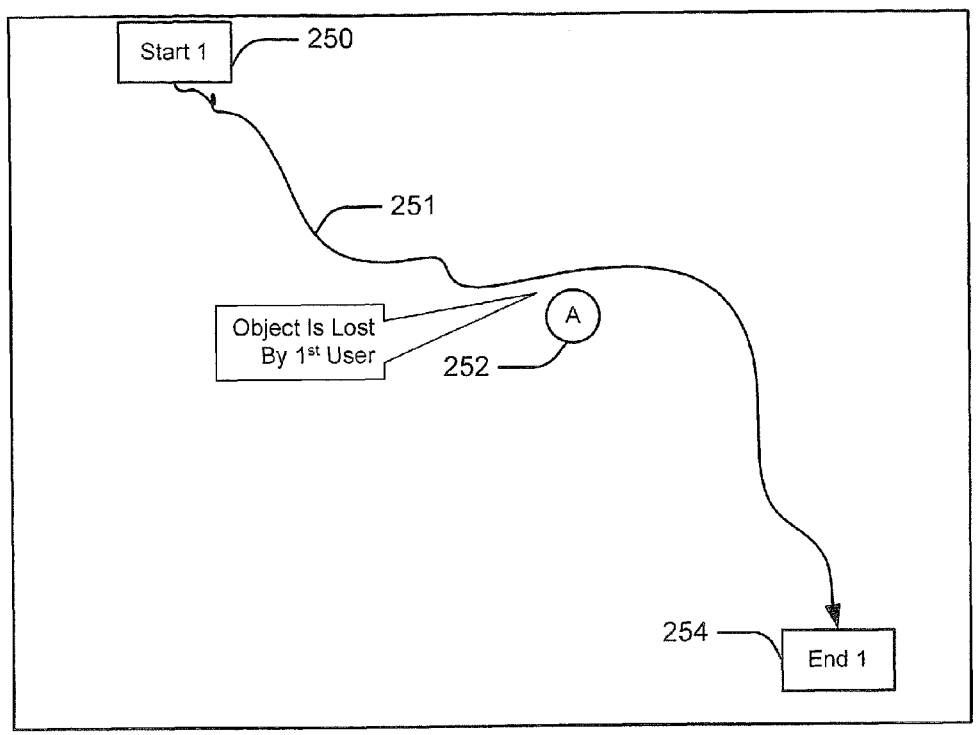
FIGS. 7A and 7B are sequential schematic diagrams illustrating an exemplary application using some embodiments of the invention.
Figure 7B:
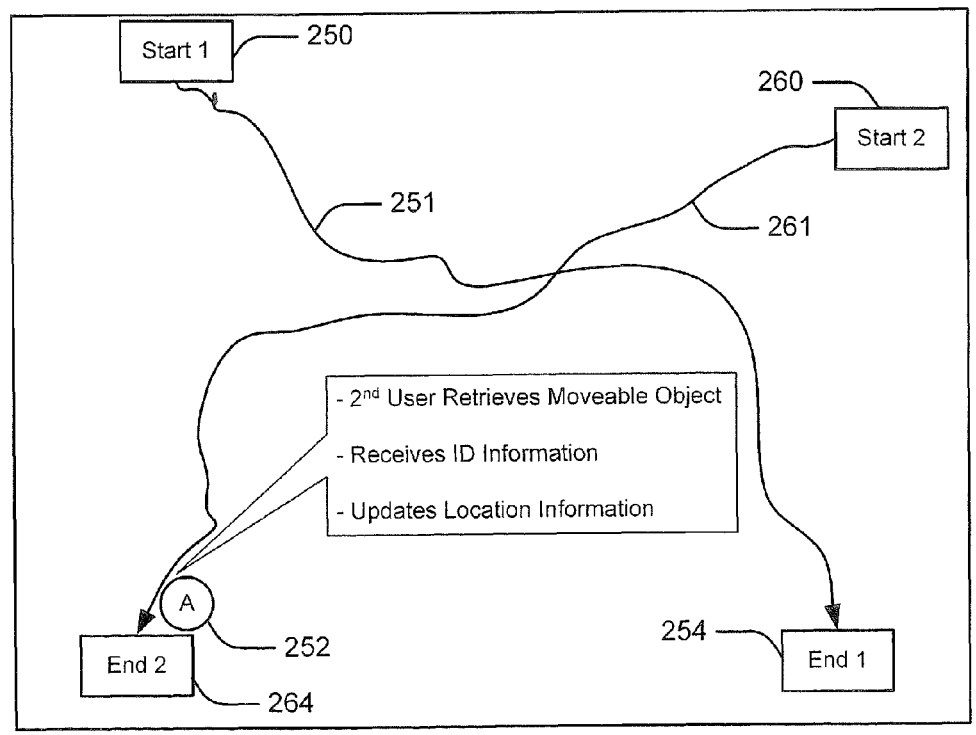

Reference is now made to FIGS. 7A and 7B, which are sequential schematic diagrams illustrating an exemplary application using some embodiments of the invention. Referring to FIG. 7A, a first user possessing a first user terminal traverses a first path 251 that begins at a first starting location 250 and ends at a first ending location 254. As the first user traverses the first path 251 be unknowingly drops a movable object 252. Referring to FIG. 7B, a second user possessing a second user terminal traverses a second path 261 that begins at a second starting location 261 and ends at a second ending location 264. As the second user traverses the second path 261, she finds and retrieves, moves and/or removes the moveable object 252. In this manner, the second user terminal becomes proximate the movable object 252. In accordance with embodiments described herein, the second user terminal receives ID information corresponding to the movable object 252. The ID information may be evaluated and it may be determined that the movable object 252 is associated with the first user and/or the first user terminal. Location information corresponding to the location of the second user terminal may be determined and a message including location of the movable object 252 may be sent to the first user terminal. As the second user traverses the second path, the location information corresponding to the location of the second user terminal may be updated and provided to the first user and/or first user terminal. In this manner, the first user may be informed as to the updated location of the movable object 252.

Figure 8:
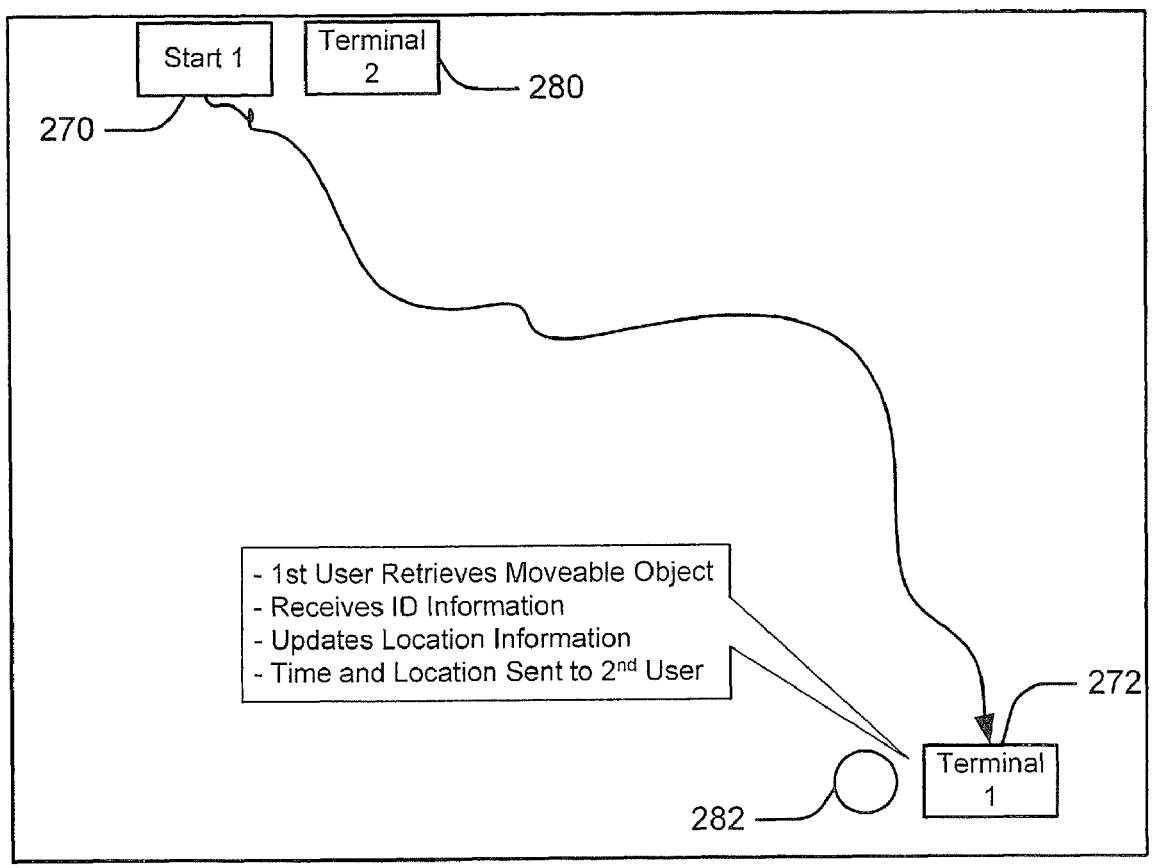
FIG. 8 is a schematic diagram illustrating an exemplary application using some embodiments of the invention.

Reference is now made to FIG. 8, which is a schematic diagram illustrating an exemplary application using some embodiments of the invention. A first user 270 possessing a first user terminal coordinates with the second user 280 possessing a second user terminal for the first user 270 to take possession of a movable object 282 that is associated with the second user 280. For example, the first user 270 may be renting a car from the second user 280. When a first user 270 takes possession of the movable object 282, the first user terminal receives ID information from the movable object 282 based on their proximity. The ID information is evaluated and determined to be associated with the second user 280. A message including the ID information and location information may be sent to the second user terminal. In this manner, the second user 280 is notified when and where the first user 270 takes possession of the movable object 282. In the context of the rental car example provided above, the rental car company receives a message confirming the time and place that the renter takes possession of the car. Moreover, in some embodiments, the rental car company may receive updated location information by virtue of the ID information received by the renter's terminal.

In a similar, non-illustrated example, a user location may be reported by virtue of identification information corresponding to a movable object carried by the user. For example, an employer may determine an employee location using the methods described herein by virtue of a movable object carried and/or possessed by the employee.

As will be appreciated by one of skill in the art, the present invention may be embodied as a method, device, system, or computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present invention was described in part above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The figures illustrate the architecture, functionality, and operations of some embodiments of methods, systems, and computer program products for of providing location information associated with moveable objects. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A method of providing location information associated with moveable objects comprising:
   periodically receiving identification (ID) information at a first terminal from a moveable object via a Radio Frequency Identification (RFID) signal;
   providing updated location information for the moveable object;
   determining that the moveable object is associated with a second terminal; and
   sending the updated location information to the second terminal in response to determining that the moveable object is associated with the second terminal.

2. The method of claim 1, wherein the first terminal comprises a mobile terminal and the second terminal comprises a stationary terminal.

3. The method of claim 2, wherein sending the updated location information comprises providing a map including the location information on a display of the second terminal.

4. The method of claim 1, wherein providing updated location information comprises:
   determining new location information associated with the ID information using Global Position System (GPS) information for the first terminal responsive to the periodically received ID information; and
   updating the location information with the GPS information to provide the updated location information for the moveable object.

5. The method of claim 1, wherein providing updated location information comprises:
   determining new location information associated with the ID information using network location information for the first terminal responsive to the periodically received ID information; and
   updating the location information with the network location information to provide the updated location information for the moveable object.

6. The method of claim 1, further comprising activating a location ignore flag, wherein if the location ignore flag is activated to an ignore state, then the updated location information is not sent to the second terminal.

7. The method of claim 1, wherein the movable object comprises one of a plurality of movable objects having respective unique ID information, the plurality of movable objects configured to transmit the respective unique ID information to the first terminal via RFID signals.

8. The method of claim 7, further comprising providing a plurality of most recently known location information for the plurality of movable objects.

9. The method of claim 8, wherein providing the plurality of most recently known location information comprises providing the plurality of most recently known location information via a webpage available via the Internet.

10. A computer program product for providing location information associated with moveable objects, comprising:
    a non-transitory computer readable storage medium having computer readable program code embodied therein, the computer readable program code comprising:
        computer readable program code configured to operate according to the method of claim 1.

11. The method of claim 1, further comprising evaluating the ID information relative to the first terminal to determine if the moveable object is associated with the first terminal.

12. The method of claim 1, wherein the moveable object and the second terminal are associated by common ownership.

13. The method of claim 1, wherein determining that the moveable object is associated with a second terminal comprises comparing the ID information to data in a database.

14. A mobile terminal comprising:
    a mobile terminal transceiver circuit;
    a Radio Frequency Identification (RFID) interface circuit configured to periodically receive identification (ID) information via RFID signals from one or more movable objects equipped with RFID tags; and
    a processor circuit, coupled to the mobile terminal transceiver circuit, the processor circuit configured to coordinate the operation of the mobile terminal including the mobile terminal transceiver circuit and configured to transmit ID information to a database to determine if the moveable object is associated with the mobile terminal.

15. The mobile terminal of claim 14, further comprising a location circuit configured to provide location information corresponding to the mobile terminal.

16. The mobile terminal of claim 15, wherein the location circuit is configured to provide location information corresponding to the mobile terminal using Global Position System (GPS) information.

17. The mobile terminal of claim 15, wherein the location circuit is configured to provide location information corresponding to the mobile terminal using radio frequency triangulation techniques.

18. The mobile terminal of claim 15, wherein the location circuit is configured to provide location information corresponding to the mobile terminal using communication network location information corresponding to the mobile terminal.

19. The mobile terminal of claim 14, wherein if the moveable object is not associated with the mobile terminal, a location information message is generated and sent to an associated terminal that is associated with the moveable object.

20. The mobile terminal of claim 19, wherein the location information message comprises a map including the location information on a display of the associated terminal.

21. A system for providing location information associated with movable objects, the system comprising:
    a database that is configured to associate multiple terminals and respective identification (ID) information corresponding to moveable objects;
    a first terminal that is configured to receive ID information from a movable object via a Radio Frequency Identification (RFID) signal and to generate location information corresponding to the location of the first terminal;

a comparison circuit that is configured to receive the ID information from the first terminal and to determine if the first terminal is associated with the moveable object; and a means for sending both the ID information and the location information corresponding to the location of the first terminal to a second terminal, wherein said second terminal is associated with the movable object and configured to receive the ID information and the location information corresponding to the first terminal.

22. The system of claim 21, wherein the comparison circuit is further configured to determine whether the second terminal is associated with the moveable object.

23. The system of claim 21, further comprising:

a means for updating the location information corresponding to the first terminal; and a means for sending updated location information to the second terminal.

* * * * *